US009854827B2

(12) United States Patent
Woodyer et al.

(10) Patent No.: US 9,854,827 B2
(45) Date of Patent: *Jan. 2, 2018

(54) SWEETENER (71) Applicant: Tate & Lyle Ingredients Americas LLC, Hoffman Estates, IL (US)

(72) Inventors: Ryan D. Woodyer, Hoffman Estates, IL (US); Jason C. Cohen, Hoffman Estates, IL (US); John R. Bridges, Hoffman Estates, IL (US)

(73) Assignee: TATE & LYLE INGREDIENTS AMERICAS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/212,196

(22) Filed: Mar. 14, 2014

(65) Prior Publication Data
US 2014/0271748 A1   Sep. 18, 2014

Related U.S. Application Data (60) Provisional application No. 61/793,707, filed on Mar. 15, 2013.

(51) Int. Cl.
*A23L 27/30* (2016.01)
*A23L 2/60* (2006.01)
*A23P 20/12* (2016.01)

(52) U.S. Cl.
CPC .............. *A23P 20/12* (2016.08); *A23L 2/60* (2013.01); *A23L 27/36* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 4,570,029 | A | 2/1986 | Kulprathipanja et al. |
| 4,692,514 | A | 9/1987 | Chang |
| 4,880,920 | A | 11/1989 | Chang |
| 5,286,499 | A | 2/1994 | Courtright |
| 5,411,880 | A | 5/1995 | Izumori et al. |
| 5,679,562 | A | 10/1997 | Izumori et al. |
| 6,051,236 | A | 4/2000 | Portman |
| 7,186,431 | B1 | 3/2007 | Silver |
| 8,012,940 | B2 | 9/2011 | Nagata |
| 8,030,035 | B2 | 10/2011 | Oh et al. |
| 8,216,818 | B2 | 7/2012 | Maruta et al. |
| 8,383,183 | B2 | 2/2013 | Prakash et al. |
| 8,420,606 | B2 | 4/2013 | Izumori et al. |
| 2002/0197352 | A1 | 12/2002 | Portman |
| 2003/0064135 | A1 | 4/2003 | Portman |
| 2004/0143024 | A1 | 7/2004 | Yoshino et al. |
| 2005/0013915 | A1 | 1/2005 | Riha et al. |
| 2005/0037121 | A1 | 2/2005 | Rathjen |
| 2005/0095271 | A1 | 5/2005 | Mathewson |
| 2005/0106305 | A1 | 5/2005 | Abraham |
| 2005/0245459 | A1 | 11/2005 | Izumori et al. |
| 2007/0020358 | A1 | 1/2007 | Mower |
| 2007/0116823 | A1 | 5/2007 | Prakash et al. |
| 2008/0221044 | A1 | 9/2008 | Tokuda et al. |
| 2008/0260925 | A1 | 10/2008 | Zink |
| 2008/0292765 | A1 | 11/2008 | Prakash et al. |
| 2009/0068710 | A1 | 3/2009 | Izumori et al. |
| 2009/0304891 | A1 | 12/2009 | Fujihara et al. |
| 2010/0129865 | A1 | 5/2010 | Maruta et al. |
| 2010/0130435 | A1 | 5/2010 | Tokuda et al. |
| 2010/0166678 | A1 | 7/2010 | Iida et al. |
| 2010/0204346 | A1 | 8/2010 | Okuma et al. |
| 2010/0222284 | A1 | 9/2010 | Tokuda et al. |
| 2010/0285195 | A1 | 11/2010 | Fisher et al. |
| 2010/0285197 | A1 | 11/2010 | Fisher et al. |
| 2011/0112043 | A1 | 5/2011 | Izumori et al. |
| 2011/0160311 | A1 | 6/2011 | Prakash et al. |
| 2011/0237790 | A1 | 9/2011 | Lee et al. |
| 2011/0275138 | A1 | 11/2011 | Maruta et al. |
| 2011/0318464 | A1 | 12/2011 | Prakash et al. |
| 2012/0070534 | A1 | 3/2012 | Suzuki |
| 2012/0076908 | A1 | 3/2012 | Fujihara et al. |
| 2012/0094940 | A1 | 4/2012 | Takamine et al. |
| 2012/0076893 | A1 | 5/2012 | Asayama et al. |
| 2012/0244580 | A1 | 9/2012 | Hung |
| 2013/0012459 | A1 | 1/2013 | Tokuda et al. |

(Continued)

FOREIGN PATENT DOCUMENTS

| | | |
|---|---|---|
| AU | 2011-203233 A1 | 7/2011 |
| CA | 1292988 | 12/1991 |

(Continued)

OTHER PUBLICATIONS

Heimbach, J., "Determination of the GRAS Status of the Use of Luo Han Fruit Concentrate as Flavor Modifier and Sweetener," Jul. 2009, p. 1-112.*
Wang, L. et al., "Cucurbitane Glycosides Derived from Mogroside IIE: Structure-Taste Relationships, Antioxidant Activity, and Acute Toxicity," Molecules 2014, 19, 12676-12689.*
Gerg Horn, "Making stevia sweet," New Hope Network, Ingredients, published Oct. 24, 2010, <http://www.newhope.com/sweeteners/making-stevia-sweet>, p. 1-5.*
Notification of Transmittal of the International Search Report and the Written Opinion of the International Searching Authority, or the Declaration Issued for International Application No. PCT/GB2014/050814 , Completed May 14, 2014 and dated Jun. 23, 2014.
Combined Search and Examination Report Issued for Application No. GB 1309077.4 dated Nov. 15, 2013.
Matsuo, et al.; *Dietary D-psicose, a C-3 epimer of D-fructose, suppresses the activity of hepatic lipogenic enzymes in rats*; Asia Pacific J. Clin. Nutr. (2001) 10(3): 233-237.

(Continued)

*Primary Examiner* — Tracy Vivlemore
*Assistant Examiner* — Monica A Shin
(74) *Attorney, Agent, or Firm* — RatnerPrestia (57) ABSTRACT

A low or zero calorie sweetener composition with sweetness synergy, providing a reduction in off-taste and a desirable temporal profile. The sweetener composition is suitable for use as a substitute for high calorie sugars. The sweetener composition is for use in food and beverage products, pharmaceutical products, nutritional products, and cosmetic products.

20 Claims, 3 Drawing Sheets

(56) References Cited

U.S. PATENT DOCUMENTS

| | | |
|---|---|---|
| 2013/0034408 A1 | 2/2013 | Maloney |
| 2013/0136838 A1 | 5/2013 | San Miguel et al. |
| 2014/0037814 A1* | 2/2014 | Quinlan .................. A23L 1/221 426/548 |
| 2014/0087049 A1* | 3/2014 | Ankolekar .............. A23L 1/221 426/548 |
| 2014/0272068 A1* | 9/2014 | Prakash .................... A23L 2/60 426/548 |

FOREIGN PATENT DOCUMENTS

| | | |
|---|---|---|
| CN | 1 266 834 | 3/1985 |
| CN | 1849078 | 10/2006 |
| CN | 102876817 | 1/2013 |
| EP | 1 864 669 | 12/2007 |
| EP | 2 156 751 A1 | 5/2008 |
| EP | 2 098 227 A1 | 9/2009 |
| EP | 2 537 42 2 A1 | 12/2012 |
| EP | 2 548 453 | 1/2013 |
| JP | 2001-11090 | 1/2001 |
| JP | 2001 354690 | 12/2001 |
| JP | 2005-213227 | 11/2005 |
| JP | 2008-43342 | 2/2008 |
| JP | 2008 48685 | 3/2008 |
| JP | 2010 018528 A | 1/2010 |
| JP | 2010 178683 A | 8/2010 |
| JP | 4724824 | 7/2011 |
| JP | 4761424 | 8/2011 |
| JP | 2011205913 | 10/2011 |
| JP | 2013138660 | 7/2013 |
| JP | 5308585 | 10/2013 |
| JP | 5314207 | 10/2013 |
| KR | 10-0832339 B1 | 5/2008 |
| KR | 10-2011-0041910 A | 4/2011 |
| KR | 20110041910 | 4/2011 |
| KR | 101106253 | 1/2012 |
| WO | WO 94/18855 | 9/1994 |
| WO | 9930577 | 6/1999 |
| WO | WO 07/010975 | 1/2007 |
| WO | WO 07/010976 | 1/2007 |
| WO | WO 08/059625 | 5/2008 |
| WO | WO 2008/102137 | 8/2008 |
| WO | WO 2011/040708 A2 | 4/2011 |
| WO | WO 2011/139959 A1 | 11/2011 |
| WO | WO 2013/036768 | 3/2013 |
| WO | WO 2013/039365 | 3/2013 |
| WO | 2013/081294 | 6/2013 |
| WO | WO 2014/025235 A1 | 2/2014 |

OTHER PUBLICATIONS

Matsuo, et al.; *D-Psicose Is a Rare Sugar That Provides No Energy to Growing Rats*; J. Nutr. Sci. Vitaminol, 48, 77-80, 2002.

Doner; *Isomerization of D-Fructose by Base: Liquid-Chromatographic Evaluation and the Isolation of D-Psicose*; Carbohydrate Research, 70 (1979)209-216 © Elsevier Scientific Publishing Company.

Angyal; *The Lobry de Bruyn-Alberda van Ekenstein Transformation and Related Reactions*; Topics in Current Chemistry, vol. 215.

Bruijn, et al.; *Alkaline Degradation of Monosaccharides V: Kinetics of the Alkaline Isomerization and Degradation of Monosaccharides*; Recueil des Travaux Chimiques des Pays-Bas, 106/2, Feb. 1987.

Combined Search and Examination Report dated Aug. 21, 2014 for GB Application No. 1403030.8, 8 pgs.

Combined Search and Examination Report Issued for Application No. GB 1309076.6 dated Nov. 15, 2013.

Combined Search and Examination Report issued for Application No. GB 1309079.0 dated Nov. 15, 2013.

Entire patent prosecution history of U.S. Appl. No. 14/212,152, filed Mar. 14, 2014, entitled, "Sweetener."

Entire patent prosecution history of U.S. Appl. No. 14/212,178, filed Mar. 14, 2014, entitled, "Sweetener."

Notification of Transmittal of International Search Report and the Written Opinion of the International Searching Authority, or the Declaration Issued for International Application No. PCT/GB2014/050812, Completed May 13, 2014 and dated May 23, 2014.

Notification of Transmittal of International Search Report and the Written Opinion of the International Searching Authority, or the Declaration Issued for International Application No. PCT/GB2014/050813, Completed May 13, 2014 and dated May 23, 2014.

Definition of "buttercream" from Merriam Webster On-Line Dictionary, downloaded Dec. 1, 2015 from http://www.merriam-webster.com/dictionary/buttercream.

Keith et al., "Discrimination tests: Evaluating context effects and respondent reliability using the switchback experimental design", Journal of Targeting, Measurement and Analysis for Marketing (2009) 17, pp. 115-125.

Non Final Office Action dated Feb. 2, 2016 for U.S. Appl. No. 14/212,152.

Wiet et al., "Sensory Characteristics of Sucralose and other High Intensity Sweeteners", Journal of Food Science, vol. 57, No. 4, 1992, pp. 1014-1019.

Zijie et al., "Enzymatic Synthesis of D-Sorbose and D-Psicose with Aldolase RhaD; Effect of Acceptor Configuration on Enzyme Stereoselectivity", Bioorg Med Chem Lett. Dec. 1, 2011; 21(23) pp. 7081-7084.

International Preliminary Report on Patentability for International Application No. PCT/GB2014/050812 dated Sep. 15, 2015.

International Preliminary Report on Patentability for International Application No. PCT/GB2014/050813 dated Sep. 15, 2015.

International Preliminary Report on Patentability for International Application No. PCT/GB2014/050814 dated Sep. 15, 2015.

Final Office Action dated May 21, 2015 in U.S. Appl. No. 14/212,178.

Shiqiong, "The General Situation for the Research and Development of Mogroside Sweet Ingredients", China Food Additives, 1st Ed. 1999 with translation, 12 pages.

First Office Action issued in Chinese Application No. 201480015959.0 dated Nov. 2, 2016.

Entire patent prosecution history of U.S. Appl. No. 14/775,336, filed Sep. 11, 2015, entitled, "Improved Sweetener."

Entire patent prosecution history of U.S. Appl. No. 14/777,047, filed Sep. 15, 2015, entitled, "Improved Sweetener."

Entire patent prosecution history of U.S. Appl. No. 14/777,157, filed Sep. 15, 2015, entitled, "Improved Sweetener."

* cited by examiner

SWEETENER

CROSS REFERENCE TO RELATED APPLICATION

This application claims priority to U.S. Provisional Application No. 61/793,707 filed Mar. 15, 2013, which is incorporated herein by reference in its entirety for all purposes.

FIELD OF THE INVENTION

The present invention relates generally to a low or "zero"-calorie synergistic sweetener composition. In particular, the present invention relates to a sweetener composition with sweetness synergy, a reduction of off-taste and a desirable temporal profile. The present invention also relates to food or beverage products comprising said sweetener composition.

BACKGROUND OF THE INVENTION

Many food and beverage products contain nutritive sweeteners such as sucrose (generally referred to as 'sugar' or 'table sugar'), glucose, fructose, corn syrup, high fructose corn syrup and the like. Such sweeteners supply not only sweetness to the food and beverage products, but also bulk, texture and desirable functional properties such as browning, humectancy, freezing point depression and the like. They also produce a favorable sensory response, for example in terms of quality of sweetness, lack of bitterness and off taste, desirable temporal profile and desirable mouthfeel.

Although desirable in terms of taste and functional properties, excess intake of nutritive sweeteners, such as sucrose, has long been associated with an increase in diet-related health issues, such as obesity, heart disease, metabolic disorders and dental problems. This worrying trend has caused consumers to become increasingly aware of the importance of adopting a healthier lifestyle and reducing the level of nutritive sweeteners in their diet.

In recent years, there has been a movement towards the development of replacements for nutritive sweeteners, with a particular focus on the development of low or zero-calorie sweeteners. An ideal replacement for a nutritive sweetener is a sweetener that has the same desirable taste characteristics and functional properties as the nutritive sweetener, but which also has fewer or substantially no calories. Aiming to meet this growing need, the market has been flooded with possible candidates to replace conventional nutritive sweeteners. Unfortunately, however, many of the low or zero calorie replacements offered on the market lack one or all of the necessary characteristics, and often exhibit bitterness or off-taste. Therefore, many of the proposed sweeteners are not an ideal replacement for nutritive sweeteners.

One proposed alternative to nutritive sweeteners is allulose (also known as D-psicose). Allulose is known as a "rare sugar", since it occurs in nature in only very small amounts. It provides around 70% of the sweetness of sucrose, but only around 5% of the calories (approximately 0.2 kcal/g). It may therefore essentially be considered to be a 'zero calorie' sweetener.

In view of its scarcity in nature, production of allulose relies on the epimerization of readily available fructose. Ketose-3-epimerases can interconvert fructose and allulose, and various ketose-3-epimerases are known for carrying out this conversion.

U.S. Pat. No. 8,030,035 and PCT Publication No. WO2011/040708 disclose that D-psicose can be produced by reacting D-fructose with a protein derived from *Agrobacterium tumefaciens*, and having psicose 3-epimerase activity.

US Patent Publication No. 2011/0275138 discloses a ketose 3-epimerase derived from a microorganism of the *Rhizobium* genus. This protein shows a high specificity to D- or L-ketopentose and D- or L-ketohexose, and especially to D-fructose and D-psicose. This document also discloses a process for producing ketoses by using the protein.

Korean Patent No. 100832339 discloses a Sinorhizobium YB-58 strain which is capable of converting fructose into psicose (i.e. allulose), and a method of producing psicose using a fungus body of the Sinorhizobium YB-58 strain.

Korean Patent Application No. 1020090098938 discloses a method of producing psicose using *E. coli* wherein the *E. coli* expresses a polynucleotide encoding a psicose 3-epimerase.

Allulose is present in processed cane and beet molasses, steam treated coffee, wheat plant products, and high fructose corn syrup. D-allulose is the C-3 epimer of D-fructose and the structural differences between allulose and fructose result in allulose not being metabolized by the human body to any significant extent, and thus having "zero" calories. Thus, allulose is thought to be a promising candidate as a replacement for nutritive sweeteners and as a sweet bulking agent, as it has no calories and is reported to be sweet while maintaining similar properties to sucrose.

One of the most recently proposed alternatives to table sugar is Monk Fruit extract. Monk fruit is a fruit from the plant species *Siraitia grosvenorii*, of the Cucurbitaceae family, and is a type of small melon which grows exclusively in tropical and subtropical regions of Southeast Asia. This fruit is also known as "Luo han guo", is roughly 200 times sweeter than cane sugar, and provides calorie-free sweetness. The main sweet components of Monk Fruit leading to its sweet taste are known as mogrosides. Mogrosides are members of the family of triterpene glycosides. The sweet taste of mogrosides is thought to be related to the number of glucose units present in the mogroside. Examples of mogrosides found in Monk Fruit are Mogroside V, Mogroside IV, Mogroside VI, Oxomogroside V, Mogroside IIIE, and Siamenoside I.

However, more recent studies have shown that some mogrosides may exhibit an off-taste and a less desirable temporal profile. Furthermore, allulose may have limitations in use due to cost and digestive tolerance in some applications. Therefore, there is a need to provide an improved replacement for sucrose and other nutritive sweeteners that has low or zero-calories and is without limitations in use, but which also has taste characteristics similar to those of sucrose.

SUMMARY OF THE INVENTION

The present invention seeks to provide a solution to the above mentioned problem by providing a sweetener composition having taste characteristics comparable to sucrose, but having low or no calories. Advantageously, the present invention also seeks to provide a sweetener composition which provides a reduction in off-taste or off-flavor, a desirable temporal profile and improved mouth feel, compared with known proposed sweeteners.

According to a first aspect of the present invention, there is provided a sweetener composition comprising allulose, and at least one mogroside.

Preferably, the at least one mogroside is selected from the group consisting of Mogroside V, Mogroside IV, Mogroside VI, Oxomogroside V, Mogroside IIIE, and Siamenoside I, or mixtures thereof.

Advantageously, the at least one mogroside is a mogroside from a fruit of a plant of the Cucurbitaceae family. Preferably, the plant is the species *Siraitia grosvenorii*. It is particularly preferred that the fruit is a Monk Fruit.

Conveniently, the at least one mogroside may be present in the sweetener composition in a fruit extract from a fruit of a plant of the Cucurbitaceae family. Preferably, the plant is the species *Siraitia grosvenorii*.

Preferably, the sweetener composition comprises allulose and a fruit extract from a fruit of a plant of the Cucurbitaceae family.

Preferably, the fruit extract comprises a mogroside composition in an amount of at least 50% by weight relative to the total weight of the fruit extract.

Preferably, the fruit extract comprises a mogroside composition in an amount of about 50% to about 90% by weight relative to the total weight of the fruit extract.

Preferably, the mogroside composition comprises at least one mogroside selected from the group consisting of Mogroside V, Mogroside IV, Mogroside VI, Oxomogroside V, Mogroside IIIE, and Siamenoside I, or mixtures thereof.

Preferably, the fruit extract comprises about 40% to about 65% by weight of Mogroside V and about 0% to 30% by weight of Mogroside IV, Mogroside VI, Oxomogroside V, Mogroside IIIE, and Siamenoside I or mixtures thereof.

Advantageously, the fruit extract comprises about 50% to 60% by weight of Mogroside V.

In a preferred embodiment, the sweetener composition comprises allulose in an amount of about 98% to about 99.9% by weight and fruit extract in an amount of about 0.1% to 2% by weight, relative to the total weight of the composition. Preferably, the sweetener composition comprises allulose in an amount of about 99.5% by weight and fruit extract of about 0.5% by weight relative to the total weight of the composition.

In some embodiments, the sweetener composition may further comprise a sweet taste improving additive, a bulking agent, a flavoring agent, and/or a stabilizer.

Preferably, the Monk Fruit extract is the commercially available product PureFruit™ Select, available from Tate & Lyle.

Preferably, the Monk Fruit extract is the commercially available product PureFruit™ available from Tate & Lyle.

Another aspect of the present invention provides a food or beverage product comprising a sweetener composition according to the invention.

A further aspect of the present invention provides a table-top sweetener comprising a sweetener composition according to the invention.

Further aspects of the present invention provide: a bulking agent comprising a sweetener composition according to the invention; a coating agent comprising a sweetener composition according to the invention; a cosmetic product comprising a sweetener composition according to the invention; a pharmaceutical product comprising a sweetener composition according to the invention; a nutritional product comprising a sweetener composition according to the invention; and a sports product comprising a sweetener composition according to the invention.

Another aspect of the present invention provides the use of a sweetener composition according to the invention in a food product, a beverage product, a pharmaceutical product, a nutritional product, a sports product, or a cosmetic product.

Another aspect of the present invention provides the use of a sweetener composition according to the invention as a bulking agent.

Another aspect of the present invention provides the use of a sweetener composition according to the invention as a coating agent.

DETAILED DESCRIPTION

The present invention is based on the finding that allulose and at least one mogroside, when present in a composition, exhibit sweetness synergy whereby the blend is sweeter than the expected sweetness based on the sweetness of its components. Furthermore, it has been found that this blend of allulose and at least one mogroside addresses problems associated with the individual components, in particular, with regard to the off-flavor and/or undesirable temporal profile that may be associated with some mogrosides.

Due to the presence of the zero calorie sweeteners, the sweetener composition is low or "zero" calorie. Furthermore, as a consequence of the sweetness synergy exhibited by the composition, the amount of the composition required to provide a given level of sweetness is less than would be expected in the absence of synergy, thereby allowing a further reduction in calories. Thus, the sweetener of the present invention provides enhanced sweetness, improves the balance of flavor by reducing off-taste or off-flavor, and provides a more desirable temporal profile, while at the same time allowing a significant reduction in calories compared to a sweet-equivalent amount of a conventional nutritive sweetener.

Using the sweetener composition of the present invention allows delivery of an increased sweetness in food or beverage products when compared to the individual components used separately. This enhanced sweetness means that a smaller amount of sweetener can be used in these products, to provide a temporal and taste profile that closely matches that of sucrose.

In general terms, the present invention relates to a sweetener composition comprising allulose and at least one mogroside.

The term "allulose" as used herein refers to a monosaccharide sugar of the structure shown as a Fischer projection in below Formula I. It is also known as "D-psicose":

Formula (I)

The term "mogroside" as used herein refers to a family of compounds found in plants such as Monk Fruit. Mogrosides are glycosides of cucurbitane derivatives.

Mogroside V (also known as esgoside) has the following formula:

Mogroside IV has the following formula:

11-Oxomogroside V has the following formula:

Siamenoside I has the following formula:

Mogroside VI has the following formula:

Mogroside III E has the following formula:

The term "fruit extract" as used herein refers to a fruit extract or a sample taken from a fruit of a plant of the Cucurbitaceae family, comprising at least one mogroside.

The term "Monk Fruit extract" as used herein refers to an extract or sample taken from a Monk Fruit from the Monk Fruit plant, *Siraitia grosvenorii*, comprising at least one mogroside.

The term "mogroside composition" as used herein refers to a composition comprising at least one mogroside.

The term "temporal profile" of a composition, sugar or sweetener, as used herein, is a measure of the perceived sweetness intensity of said composition, sugar or sweetener over time. A desirable or advantageous temporal profile is one wherein sweetness is observed quickly and has a short linger similar to that of sucrose.

The term "sucrose equivalent value" or "SEV" as used herein refers to the sweetness equivalent of a sweetener related to the sweetness of sucrose. For example, a sweetener at an SEV value of 5 would have a sweetness similar to a 5% by weight solution of sucrose.

The term "zero calorie" as used herein refers to a sweetener with less than 5 calories per reference amount customarily consumed (RACC) and per labeled serving.

The term "low calorie" as used herein refers to a sweetener having 40 calories or fewer per reference amount customarily consumed (RACC) and per labeled serving.

All amounts given in % by weight are quoted on a dry solids (ds) basis unless specifically stated otherwise. Thus, where components are provided other than in their pure form, the amount added should be adjusted to provide the required amount on a dry solids basis. For example, where allulose is provided as a syrup, the amount of syrup used should be adjusted to supply the required amount of allulose on a dry solids basis.

The present invention provides a sweetener composition comprising allulose and at least one mogroside.

In a preferred embodiment, the mogroside is selected from the group consisting of Mogroside V, Mogroside IV, Mogroside VI, Oxomogroside V, Mogroside IIIE, and Siamenoside I or mixtures thereof. It is generally preferred that at least four mogrosides are present in the sweetener composition namely, Mogroside V, Mogroside IV, 11-Oxomogroside V and Siamenoside I. It is particularly preferred that the at least one mogroside is Mogroside V.

In a further preferred embodiment, the at least one mogroside is from a fruit from a plant of the Cucurbitaceae family. The Cucurbitaceae family of plants includes the plant species *Siraitia grosvenorii*, which is also known as the Monk Fruit plant. The mogroside may be present in a sweetener composition of the present invention in an extract from a fruit of a plant of the Cucurbitaceae family. The fruit extract comprises at least one mogroside. It is particularly preferred that the fruit is the Monk Fruit from the species *Siraitia grosvenorii*.

The fruit extract or Monk Fruit extract for use in the present invention may be prepared as follows: The fruit is crushed to release its natural juices. The crushed fruit is then infused with hot water to extract the vitamins, antioxidants, and sweet components. The infusion is then passed through a series of filters to obtain a pure, sweet fruit concentrate.

In a still preferred embodiment, the sweetener composition of the present invention comprises allulose and a fruit extract from a fruit of a plant of the Cucurbitaceae family. Preferably, the fruit extract is a Monk fruit extract.

In a particularly preferred embodiment, the fruit extract comprises a mogroside composition in an amount of at least about 50% by weight relative to the total weight of the fruit extract. Preferably, the fruit extract comprises a mogroside composition in an amount of about 50% to about 90% by weight relative to the total weight of the fruit extract.

In a preferred embodiment, the mogroside composition comprises at least one mogroside selected from the group consisting of Mogroside V, Mogroside IV, Mogroside VI, Oxomogroside V, Mogroside IIIE, and Siamenoside I or mixtures thereof. It is generally preferred that at least four mogrosides are present in the mogroside composition, namely, Mogroside V, Mogroside IV, 11-Oxomogroside V and Siamenoside I.

It is particularly preferred that the fruit extract comprises about 40% to about 65% by weight of Mogroside V and about 0% to about 30% by weight of Mogroside IV, Mogroside VI, Oxomogroside V, Mogroside IIIE, or Siamenoside I, or mixtures thereof.

In a further embodiment, the fruit extract comprises about 50% to about 60% by weight of mogroside V and about 0% to about 30% by weight of Mogroside IV, Mogroside VI, Oxomogroside V, Mogroside IIIE, or Siamenoside I, or mixtures thereof.

In a further preferred embodiment, the fruit extract comprises about 40%, 41%, 42%, 43%, 44%, 45%, 46%, 47%, 48%, 49%, 50%, 51%, 52%, 53%, 54%, 55%, 56%, 57%, 58%, 59%, or 60% by weight of Mogroside V. Furthermore, the fruit extract preferably comprises about 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30% by weight of Mogroside IV, Mogroside VI, Oxomogroside V, Mogroside IIIE, or Siamenoside I, or mixtures thereof.

Suitable fruit extracts or mogroside compositions for use in the present invention may be obtained following the methods of producing such extracts described in U.S. Pat. No. 5,411,755 and U.S. Publication. No. 2006/0003053.

In an embodiment, the sweetener composition comprises allulose in an amount of about 98% to about 99.9% by weight and fruit extract in an amount of about 0.1% to about 2% by weight. Alternatively, the sweetener composition comprises allulose in an amount of about 99.5% by weight and fruit extract of about 0.5% by weight.

In a preferred embodiment, the sweetener composition comprises allulose in an amount of 98%, 98.1%, 98.2%, 98.3%, 98.4%, 98.5%, 98.6%, 98.7%, 98.8%, 99%, 99.1%, 99.2%, 99.3%, 99.4%, 99.5%, 99.6%, 99.7%, 99.8%, or 99.9% by weight and fruit extract of about 0.1%. 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2% by weight.

In a further embodiment, the sweetener composition comprises allulose and a fruit extract in an amount of between 70/30 to 30/70 by percentage of added sweetness in terms of relative sugar equivalent value (SEV), preferably 50/50.

Preferably, the Monk Fruit extract is the commercially available product PureFruit™, available from Tate & Lyle or the commercially available product PureFruit™ Select, available from Tate & Lyle.

A further aspect of the present invention provides a food product comprising a sweetener composition according to the invention. Non-limiting examples of a food product include a confectionary product, a dessert product such as yogurt, ice-cream, biscuits, and cakes, a cereal product, baked goods, frozen dairy products, meats, dairy products, condiments, snack bars, soups, dressings, mixes, prepared foods, baby foods, diet preparations, syrups, food coatings, dried fruit, sauces, gravies, jams/jellies, and the like, especially those which are reduced sugar or low sugar products. The food product may be an animal feed product. The food product of the invention may comprise the sweetener composition as a coating or frosting formed on the surface of the product. This coating improves the flavor of the food product as well as its shelf life.

Another aspect of the invention provides a beverage product comprising the sweetener composition of the present invention. Non-limiting examples of a beverage product include a carbonated beverage, a non-carbonated beverage, fruit-flavored beverage, fruit-juice, tea, milk, and coffee, especially those which are reduced sugar or low sugar products.

A further aspect of the present invention provides a table-top sweetener comprising a sweetener composition according to the invention.

Another aspect of the present invention provides a bulking agent comprising a sweetener composition according to the invention.

A further aspect of the present invention provides a coating agent comprising a sweetener composition according to the invention.

A separate aspect of the present invention provides a pharmaceutical product comprising a sweetener composition according to the invention.

Another aspect of the present invention provides a nutritional or sports product comprising a sweetener composition according to the invention.

Another aspect of the present invention provides a cosmetic product comprising a sweetener composition according to the invention.

It will be appreciated that the amount of a sweetener composition according to the invention present in a food product, a beverage product, a pharmaceutical product, a nutritional product, a sports product, or a cosmetic product will depend upon the type and amount of sweetener present in the sweetener composition and the desired sweetness of the food or beverage product.

An alternative aspect of the present invention provides the use of a sweetener composition according to the invention in a food product, a beverage product, a pharmaceutical product, a nutritional product, a sports product, or a cosmetic product or as a bulking agent or coating agent.

The sweetener composition may be formulated in any ingestible form, for example, as a syrup, in powder form, tablet form, as granules, in a solution or in any other suitable form including beverages and food products.

As outlined in the below examples, the sweetener composition of the invention exhibits a sucrose equivalent value (SEV) greater than the predicted value based on its individual components. Therefore, the sweetener composition of the present invention displays sweetness synergy.

The following examples are exemplary only and are not intended to be limiting in any way.

EXAMPLES

Example 1

Evaluation of the Sensory Properties of the Sweetener Composition of the Invention.

Materials and Methods

Round table evaluations were performed with a number of test panelists. Equal sweet 10 SEV concentrations in neutral pH water were made for allulose and PureFruit™ Select and as well as equal (50/50) mixture of allulose and PureFruit™ Select. PureFruit™ Select is commercially available from Tate & Lyle. All mixtures were calculated using the Beidler mixture equation for the sweeteners. The Beidler mixture equation for sweeteners is as follows:

$$SEV = \frac{conc \cdot R_{max}}{conc + 1/K}$$

The concentration of each component in the mixture in ppm is divided by SEV (c/R) and is plotted against concentration, c. The slope of the linear regression is the maximum SEV ($R_{max}$). The y-intercept of the linear regression multiplied by $R_{max}$ is the half-maximal sweetness concentration, $1/K$. $R_{max}$ and $1/K$ are the two parameters used in the Beidler equation.

The equal-molar mixtures were tested against reference samples for the panelists to determine SEV values. Reference mixtures were 4%, 6%, 8%, 10%, 12%, and 14% sucrose in neutral pH water.

The solutions were served in 2 ounce (approximately 60 ml) soufflé cups coded with 3-digit codes at room temperature. A two minute wait period between samples was enforced. RO water and unsalted crackers were available for the panelists to clear their palates before and during testing. EyeQuestion, software distributed by Logic8 BV of Elst, The Netherlands, was used for ballot development and recording of results.

Results were collected in EyeQuestion for calculating approximate SEV level of each test sample. Z-test statistics with $\alpha=0.07$ was used to determine significant difference from the 50/50 SEV mixture predicted value.

Sweetener Compositions Tested

Conclusion

The sweetener composition according to the present invention exhibits a statistically significant sweetness synergy.

Example 2

Determination of the Temporal Profile of the Sweetness Composition of the Invention As the composition of the invention exhibited statistically significant sweetness synergy, the temporal profile of this composition was also determined. This experiment was undertaken to determine if allulose had any influence on the temporal profile of PureFruit™ Select when both components are present as a blend in a sweetener composition.

Materials and Methods

Temporal profile was completed with a trained descriptive panel. Panelists had several orientation rounds of the test samples to familiarize themselves with the protocol and the test samples. The tests were conducted as complete block designs in 3 replicates with the trained panel and were done over two testing days (one for each formula set). The presentation order was rotated. The solutions were served in 2 ounce (56 g) soufflé cups labeled with 3-digit codes, and panelists received 20 ml of each sample and were instructed to use the entire sample. Panelists were instructed to sample the product by placing the sample in their mouths and swallowing or spitting out the sample immediately while starting their intensity rating for sweetness at the same time using EyeQuestion. Intensity ratings for sweetness were collected for 2 minutes. Panelists had a two minute wait time between samples and at least a 10 minute break in-between repetitions. Panelists cleaned their palates with bottled water and unsalted crackers.

The maximum intensity of each panelist for each sample was determined for the entire temporal profile, and the

| INGREDIENT | Allulose 10% % | Allulose 10% GRAMS | PureFruit Select SEV 10 % | PureFruit Select SEV 10 GRAMS | Allulose PureFruit Select blend % | Allulose PureFruit Select blend GRAMS |
|---|---|---|---|---|---|---|
| Allulose 89% DS syrup | 17.02 | 40.848 | 0 | 0 | 8.51 | 20.424 |
| PureFruit Select | 0 | 0 | 0.0725 | 0.3480 | 0.03625 | 0.087 |
| RO Water | 82.98 | 199.152 | 99.9275 | 479.652 | 91.45375 | 219.489 |
| TOTAL | 100 | 240 | 100 | 480 | 100 | 240 |

Results

Figure 1:
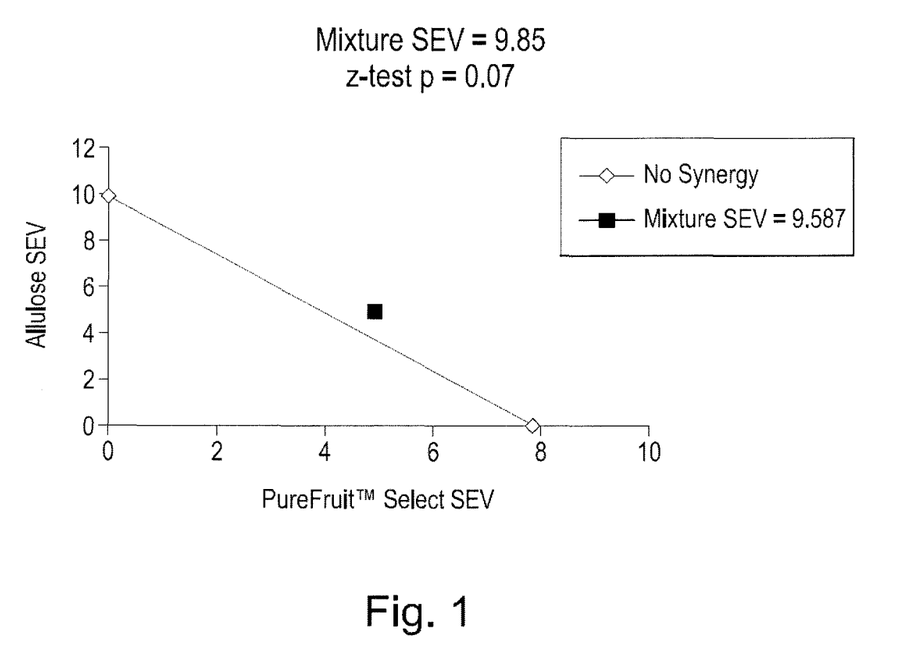
FIG. 1: Graph illustrating the SEV level of a composition comprising allulose and PureFruit™ Select.

FIG. 1 illustrates the SEV yielded for the sweetener composition of the invention. This value was compared with the predicted SEV for each of the individual component parts (as illustrated by the straight shaded line on each graph). Surprisingly, the composition of the invention, comprising allulose and PureFruit™ Select exhibited sweetness synergy. The composition yielded an SEV of 9.85, which was a higher SEV via p-value for z-test above predicted 50/50 SEV values for the blend at a greater than 90% confidence interval.

overall temporal profile data for that sample was then calculated using normalization as % of maximum (e.g. maximum value is 100%, and all intensity values are rated as a % based on value divided by maximum intensity value). Once normalized data was calculated for each panelist, averaged response across panelists was calculated. Based on these normalized values, the averaged normalized % temporal profile was then calculated as using normalization as % of maximum (e.g. max value is 100%, all intensity values are rated as a % based on value divided by maximum intensity value), and plotted for each sample.

Sweetener Compositions Tested

| INGREDIENT | Allulose SEV 7.67 % | Allulose SEV 7.67 GRAMS | PureFruit Select SEV 7.67 % | PureFruit Select SEV 7.67 GRAMS | Allulose PureFruit Select blend % | Allulose PureFruit Select blend GRAMS |
|---|---|---|---|---|---|---|
| Allulose 68% DS syrup | 16.35 | 245.25 | 0 | 0 | 8.175 | 122.625 |
| PureFruit Select | 0 | 0 | 0.0400 | 0.6000 | 0.02 | 0.3 |
| RO Water | 83.65 | 1254.75 | 99.96 | 1499.4 | 91.805 | 1377.075 |
| TOTAL | 100 | 1500 | 100 | 1500 | 100 | 1500 |

Results

Figure 2:
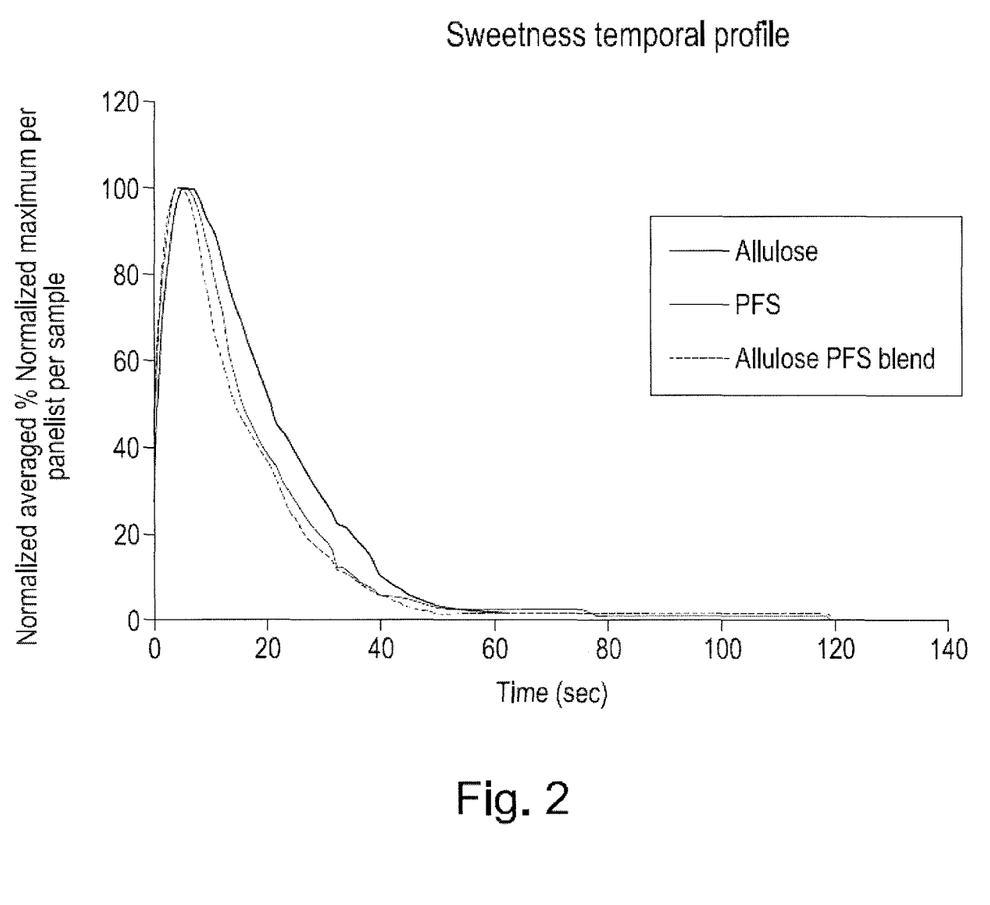
FIG. 2: Graph illustrating the sweetness temporal profile of allulose alone, PureFruit™ Select alone and a composition comprising allulose and PureFruit™ Select.
Figure 3:
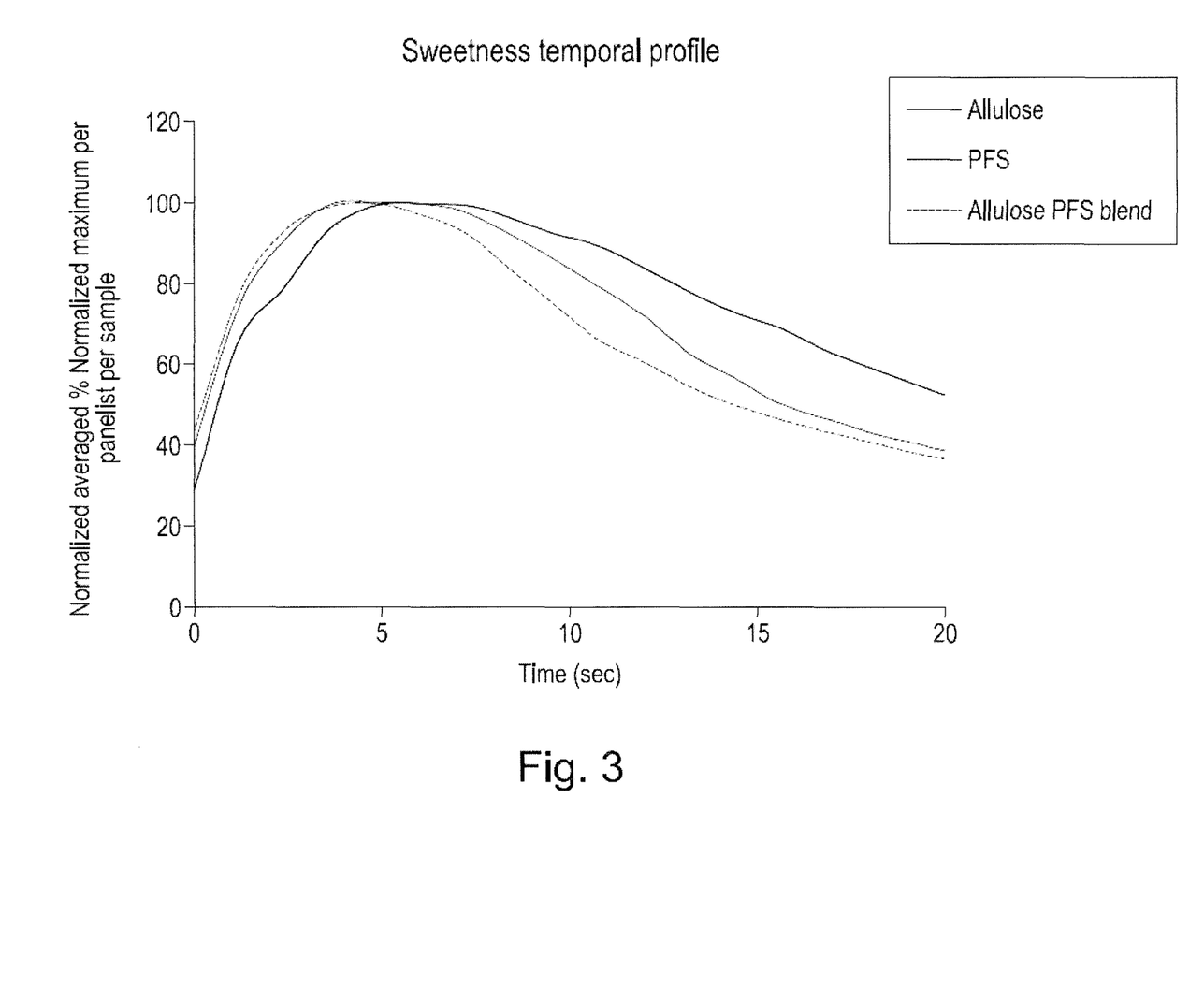
FIG. 3: Graph illustrating the sweetness temporal profile of allulose alone, PureFruit™ Select alone and a composition comprising allulose and PureFruit™ Select.

The sweetness temporal profile reported for the composition of the invention is shown in FIGS. 2 and 3. FIG. 2 illustrates sweetness onset and reports the normalized maximum intensity for each sample over a time period 0 to 140 seconds. FIG. 3 illustrates sweetness linger and reports the normalized maximum intensity for each sample over a time period 0 to 20 seconds.

As illustrated in FIGS. 2 and 3, the composition of the invention improves the temporal profile relative to PureFruit Select™ alone. As illustrated in FIG. 2, the temporal onset is quicker and as illustrated in FIG. 3 the temporal linger is shorter in the composition comprising allulose and PureFruit Select™ mixture. The temporal profile is similar to that of allulose alone and sucrose. The temporal profile of sucrose is illustrated in FIGS. 4 and 5.

Conclusion

Mixing PureFruit™ Select with allulose improves the temporal profile onset and linger properties of PureFruit™ Select.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A sweetener composition comprising allulose and Mogroside V, wherein the Mogroside V is in a fruit extract from a fruit of a plant of the Cucurbitaceae family and wherein the sweetener composition comprises allulose in an amount of about 98% to about 99.9% by weight and the fruit extract in an amount of about 0.1% to about 2% by weight.

2. The sweetener composition according to claim 1, wherein the fruit extract comprises a mogroside composition, which includes the Mogroside V, in an amount of at least 50% by weight relative to the total weight of the fruit extract.

3. The sweetener composition according to claim 1, wherein the fruit extract comprises about 40% to about 65% by weight of mogroside V and about 0% to about 30% by weight of Mogroside IV, Mogroside VI, Oxomogroside V, Mogroside IIIE or Siamenoside I, or mixtures thereof.

4. The sweetener composition according to claim 1, wherein the fruit extract comprises about 48% to about 52% of mogroside V by weight and about 25% to about 30% by weight of Mogroside IV, Oxomogroside V and Siamenoside I.

5. The sweetener composition according to claim 1, wherein the fruit extract comprises about 50% to about 60% by weight of Mogroside V relative to the total weight of the fruit extract.

6. The sweetener composition of claim 1, comprising allulose in an amount of about 99.5% by weight and the fruit extract in an amount of about 0.5% by weight.

7. The sweetener composition according to claim 1, in combination with at least one of a sweet taste improving additive, a bulking agent, a flavoring agent, or a stabilizer.

8. A food product comprising the sweetener composition according to claim 1.

9. The food product of claim 8, wherein the sweetener composition is provided as a coating or frosting on a surface of the food product.

10. A beverage product comprising the sweetener composition according to claim 1.

11. A table-top sweetener comprising the sweetener composition according to claim 1.

12. A bulking agent comprising the sweetener composition according to claim 1.

13. A coating agent comprising the sweetener composition according to claim 1.

14. A cosmetic product comprising the sweetener composition according to claim 1.

15. A pharmaceutical product comprising the sweetener composition according to claim 1.

16. A nutritional product comprising the sweetener composition according to claim 1.

17. A sports product comprising the sweetener composition according to claim 1.

18. A method of manufacturing a reduced-calorie product comprising adding the sweetener composition according to claim 1 to a food product, a beverage product, a pharmaceutical product, a nutritional product, a sports product, or a cosmetic product.

19. A method of increasing bulk of a product comprising adding a bulking agent comprising the sweetener composition according to claim 1 to the product.

20. A method of coating a product comprising applying a coating agent comprising the sweetener composition according to claim 1 to the product.

* * * * *